United States Patent [19]
Damisch et al.

[11] Patent Number: 5,460,404
[45] Date of Patent: Oct. 24, 1995

[54] TRIGGERING SYSTEM FOR AIRBAGS

[75] Inventors: Juergen W. Damisch, Eching-Otterburg; Matthias Kuchler, Seefeld-Hechendorf; Thomas Görnig, Marktindersdorf, all of Germany

[73] Assignee: Autoliv Development AB, Vargada, Sweden

[21] Appl. No.: 200,961

[22] Filed: Feb. 24, 1994

[30] Foreign Application Priority Data

Mar. 2, 1993 [DE] Germany .......................... 43 06 488.4

[51] Int. Cl.⁶ .................................................. B60R 21/32
[52] U.S. Cl. .......................................... 280/735; 307/10.1
[58] Field of Search ..................................... 280/735, 734, 280/728 R; 180/274, 282; 307/10.1

[56] References Cited

U.S. PATENT DOCUMENTS

| | | | |
|---|---|---|---|
| 3,701,903 | 10/1972 | Merhar | 280/735 |
| 4,384,734 | 5/1983 | Yasui | 280/735 |
| 4,845,377 | 7/1989 | Swart | 280/735 |
| 5,028,750 | 7/1991 | Spies et al. | 200/61.45 M |
| 5,058,920 | 10/1991 | Burger et al. | 280/735 |
| 5,135,254 | 8/1992 | Masegi et al. | 280/735 |
| 5,158,323 | 10/1992 | Yamamoto et al. | 280/735 |
| 5,311,065 | 5/1994 | Kondo | 280/735 |

FOREIGN PATENT DOCUMENTS

| | | | |
|---|---|---|---|
| 0283737 | 9/1988 | European Pat. Off. | 280/735 |
| 3803914 | 8/1989 | Germany . | |
| 4129314 | 3/1992 | Germany . | |
| 4210861 | 10/1992 | Germany | 280/735 |
| WO9002674 | 3/1990 | WIPO | 280/735 |

Primary Examiner—Kenneth R. Rice
Assistant Examiner—Peter C. English
Attorney, Agent, or Firm—Jacobson, Price, Holman & Stern

[57] ABSTRACT

The invention relates to a triggering system for airbags with an acceleration switch, which is adapted to be activated at a predetermined acceleration level. The system comprises a shunt switch arranged in parallel to the acceleration switch and which is adapted to be closed owing to activation of the acceleration switch.

18 Claims, 1 Drawing Sheet

TRIGGERING SYSTEM FOR AIRBAGS

The invention relates to a triggering system for airbags with an acceleration switch, which is adapted to be activated at a predetermined acceleration level.

Airbags may be so operated that after deployment in a vehicle crash by a pyrotechnic gas generator owing to the impact of an occupant they are partly discharged again absorbing the impact energy of the occupant. Separate airbags are employed to protect the driver and the front seat passenger against injuries to the head and chest on impact against a rigid obstacle. The gas generator deploys the driver airbag stowed in the steering wheel hub in 30 to 35 ms and the airbag of the front seat passenger stowed in the glove locker within approximately 50 ms by inflation with nitrogen. The longer time taken for deployment of the front seat passenger airbag is permissible because the geometrical distance of the front seat passenger from the glove compartment and consequently the permissible shift forwards is larger than the distance of the driver from the steering wheel. What is important for the quality of the protective function is the prompt deployment of the airbag. The occupants are only to make contact with the airbag when the same is completely deployed or inflated and is just starting to deflate.

In known deployment systems for airbags it is possible for example to utilize several gas generators. Thus for example in one known system there is one gas generator for the driver's airbag, which is of comparatively small volume and two gas generators for the comparatively larger front seat passenger airbag. The three gas generators are activated on the basis of a respective signal of an acceleration sensor or, respectively, switch present in the depployment systems. However owing to the successive activation of the firing circuits for the gas generators there is the danger of the acceleration switch, which operates electromechanically, not being closed during the entire crash so that the firing circuits for the gas generators are only partly activated. This results in a spurious operation of the airbag system.

Accordingly one object of the invention is to provide such a further development of the triggering system for airbags that there is a safe and definitely reliable activation of several firing circuits, which are to be fired in succession.

In accordance with the invention this aim is to be achieved since a shunt switch is arranged in parallel to the acceleration switch and which is adapted to be closed owing to activation of the acceleration switch.

In accordance with an advantageous development of the invention it is possible for the shunt switch to be closed for at least 10 ms and at the most 3 s after the activation of the acceleration sensor. This ensures that the firing circuits will also be activated in cases in which owing to the changes in acceleration in the course of crash the acceleration switch is not closed.

The acceleration switch can be an electromechanical switch or furthermore a reed relay.

The shunt switch is preferably a transistor switch.

The acceleration sensor can be connected on the one side with a battery and on the other side with at least one firing circuit, the shunt switch being adapted to be operated by the voltage present on the other side.

The at least one firing circuit present for a gas generator is at least connected with a crash switch in series, such crash switch being adapted to be closed when a predetermined crash condition is reached. It is however possible to provide at least one further firing circuit and one further crash switch in parallel to the first firing circuit and to the first crash switch, the second crash switch being able to be activated after the first crash switch.

On the other side of the acceleration switch it is possible to provide a diode between the shunt switch and the branch point for the control of the shunt switch.

Further advantageous developments and convenient forms will be understood from the following embodiments illustrated in the accompanying drawings.

An electromechanical acceleration switch S1 is connected on one side with a battery. On the other side it is connected with three parallel connected firing circuits SQ1, SQ2 and SQ3. The firing circuits SQ1, SQ2 and SQ3 each possess crash switches T2, T3 and T4 connected in series, which in the present case are designed in the form of transistor switches. The firing circuits are able to be operated in timed succession via a microprocessor. A user specific integrated circuit ASIC is connected with the microprocessor, This user specific integrated circuit ASIC is connected in a manner not illustrated in detail with an acceleration sensor.

Figure 1:
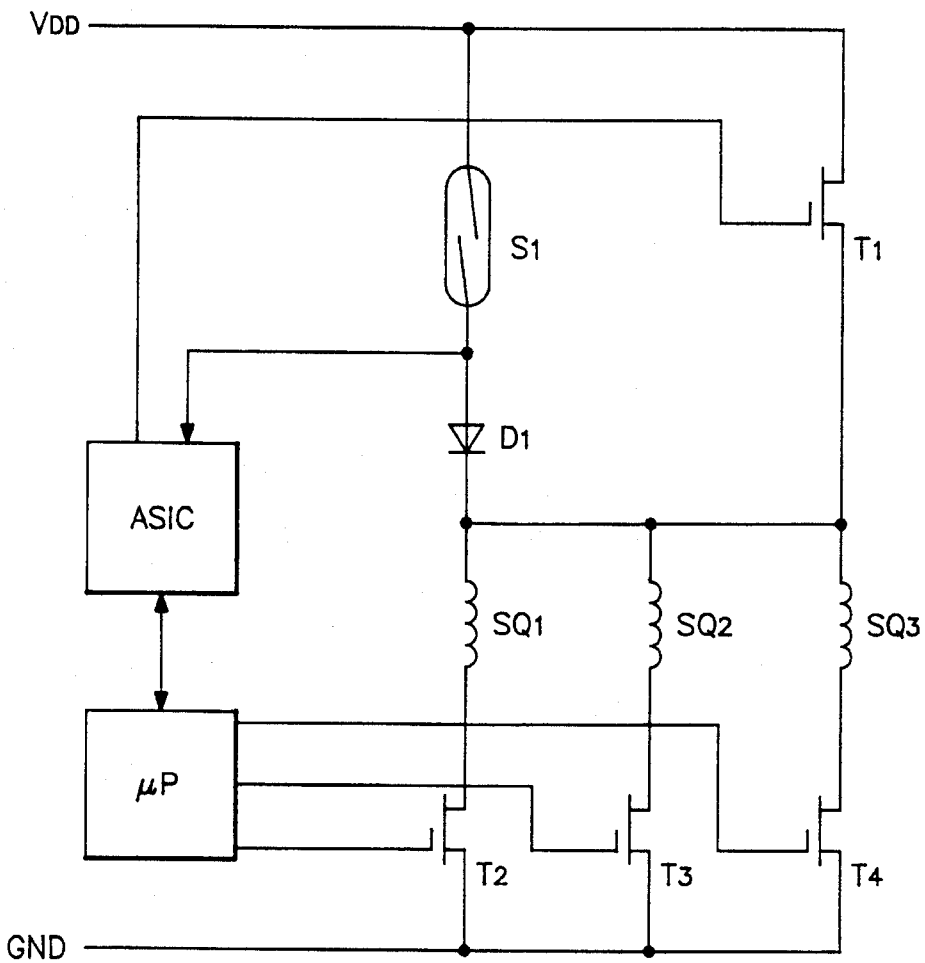
FIG. 1 is a simplified circuit diagram of one embodiment of the triggering system in accordance with the invention.

As shown in FIG. 1, a shunt switch T1 designed in the form of a transistor switch is connected in parallel to the acceleration switch S1. This shunt switch T1 is able to be operated by the user specific integrated circuit ASIC. As soon as the acceleration switch S1 closes owing to exceeding a predetermined acceleration level or value, then via a respective connection line a signal is supplied to the user specific integrated circuit ASIC. Following this the shunt switch t1 is closed for a predetermined time of for example 10 ms to 3 s. Accordingly it is possible for the firing circuits SQ1, SQ2 and SQ3 to be closed during this time window even if the acceleration sensor S1 is opened again owing to the acceleration events. In order to avoid feedback a diode D1 is placed in circuit between the branch point of the connection line between the acceleration switch S1 and the user specific integrated circuit ASIC on the one hand and the shunt switch T1 on the other hand.

Figure 2:
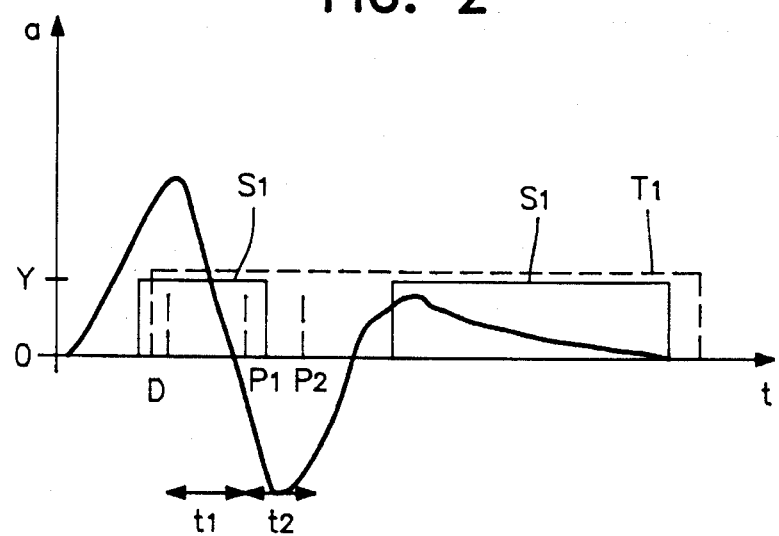
FIG. 2 shows a plot of acceleration against time, which diagrammatically indicates the changes in acceleration in the course of crash events.

An explanation will now be provided of the manner of operation of the triggering system in accordance with the invention on the basis of the changes in acceleration illustrated in FIG. 2. On the basis of a typical acceleration function during a crash S1 is respectively employed to indicate the period of time, during which the acceleration switch S1 is closed. As shown in the graph, after closing of the acceleration switch S1 at a point in time D the firing circuit for the driver airbag deployment gas generator SQ1 is activated. After a period of time $t_1$, which may for instance last 5 ms, during a point in time $P_1$ the first gas generator of the front seat passenger airbag is fired by means of the firing circuit SQ2. After a further period of time $t_2$, which again may last for 5 ms, the second firing circuit SQ3 of the second gas generator is to be fi red for the front seat passenger airbag. At this point in time however the acceleration switch S1 is open again. In order in this case to prevent the second firing circuit SQ3 for the front seat passenger airbag from not being fired, using the shunt switch T1 (curve in chained lines) it is possible to make certain that the circuit is not interrupted and that furthermore the second firing circuit SQ3 of the front seat passenger airbag is fired.

We claim:

1. A triggering system for airbags comprising an acceleration switch which is adapted to be activated at a predetermined acceleration level, said acceleration switch being connected in series with at least one firing circuit capable of effecting deployment of a respective airbag, said at least one firing circuit connected in series with a crash switch and a microprocessor which is connected to said crash switch for controlling said crash switch, wherein said triggering system further comprises:

a shunt switch connected in parallel with the acceleration switch, and means connected to said acceleration switch and shunt switch for closing said shunt switch for a predetermined period of time in response to activation of said acceleration switch, wherein said at least one firing circuit is enabled to be activated upon closure of either one of said acceleration switch and said shunt switch.

2. The triggering system as claimed in claim 1, wherein the shunt switch is closed for at least 10 milliseconds and at the most for 3 seconds after activation of the acceleration switch.

3. The triggering system as claimed in claim 1, wherein the acceleration switch is an electromechanical switch.

4. The triggering system as claimed in claim 1, wherein the acceleration switch is a reed relay.

5. The triggering system as claimed in claim 1 wherein the shunt switch is a transistor switch.

6. The triggering system as claimed in claim 1, wherein said acceleration switch has a first terminal electrically connected to a battery and a second terminal electrically connected to said at least one firing circuit, the shunt switch being closed for said predetermined period of time whenever a voltage from said battery is present on said second terminal.

7. The triggering system as claimed in claim 1, wherein said crash switch of said at least one firing circuit is closed by said microprocessor at a predetermined time after detecting a crash condition.

8. The triggering system as claimed in claim 7, wherein said at least one firing circuit comprises at least two firing circuits connected in parallel, each of which includes a series-connected crash switch which is closed by said microprocessor at different predetermined times after detecting a crash condition.

9. The triggering system as claimed in claim 1, further comprising a diode having a cathode electrically connected to said at least one firing circuit between said at least one firing circuit and said shunt switch; and an anode electrically connected to said means for closing said shunt switch, between said acceleration switch and said means for closing said shunt switch.

10. A triggering system for airbags comprising a microprocessor and an acceleration switch which closes at a predetermined acceleration level, said acceleration switch being connected in series with a plurality of firing circuits, connected in parallel, each firing circuit being capable of effecting deployment of a respective airbag, each of said firing circuits having a series-connected crash switch which is connected to and controlled by said microprocessor, and further comprising:

a shunt switch connected in parallel with the acceleration switch, means connected to said acceleration switch and said shunt switch for closing said shunt switch for a predetermined period of time whenever said acceleration switch closes, and wherein each of said firing circuits is electrically connected to said acceleration switch and said shunt switch such that each of said firing circuits is activated when a respective one of said series-connected crash switches is closed while either one of said acceleration switch and said shunt switch is also closed.

11. The triggering system of claim 10, wherein said predetermined period of time is between 10 milliseconds and 3 seconds.

12. The triggering system of claim 10, wherein said acceleration switch is an electromechanical switch.

13. The triggering system of claim 10, wherein said acceleration switch is a reed relay.

14. The triggering system of claim 10, wherein said shunt switch is a transistor switch.

15. The triggering system of claim 10, wherein the acceleration switch has a first terminal electrically connected to a battery and a second terminal connected to said plurality of firing circuits, the shunt switch being closed for said predetermined period of time upon a voltage from said battery being present on said second terminal.

16. The triggering system of claim 10, wherein said series-connected crash switches are closed by said microprocessor at respective predetermined times after detecting a crash condition via the acceleration switch.

17. The triggering system as claimed in claim 16, wherein the series-connected crash switches are closed by said microprocessor at different predetermined times after detecting a crash condition.

18. The triggering system as claimed in claim 10, and further comprising a diode, said diode having:

a cathode electrically connected to said plurality of firing circuits between said plurality of firing circuits and said shunt switch; and an anode electrically connected to said means for closing said shunt switch, between said acceleration switch and said means for closing said shunt switch.

* * * * *